July 9, 1940.  R. W. DUCKER ET AL  2,207,660
GAS FILTER
Filed June 16, 1939  2 Sheets-Sheet 1
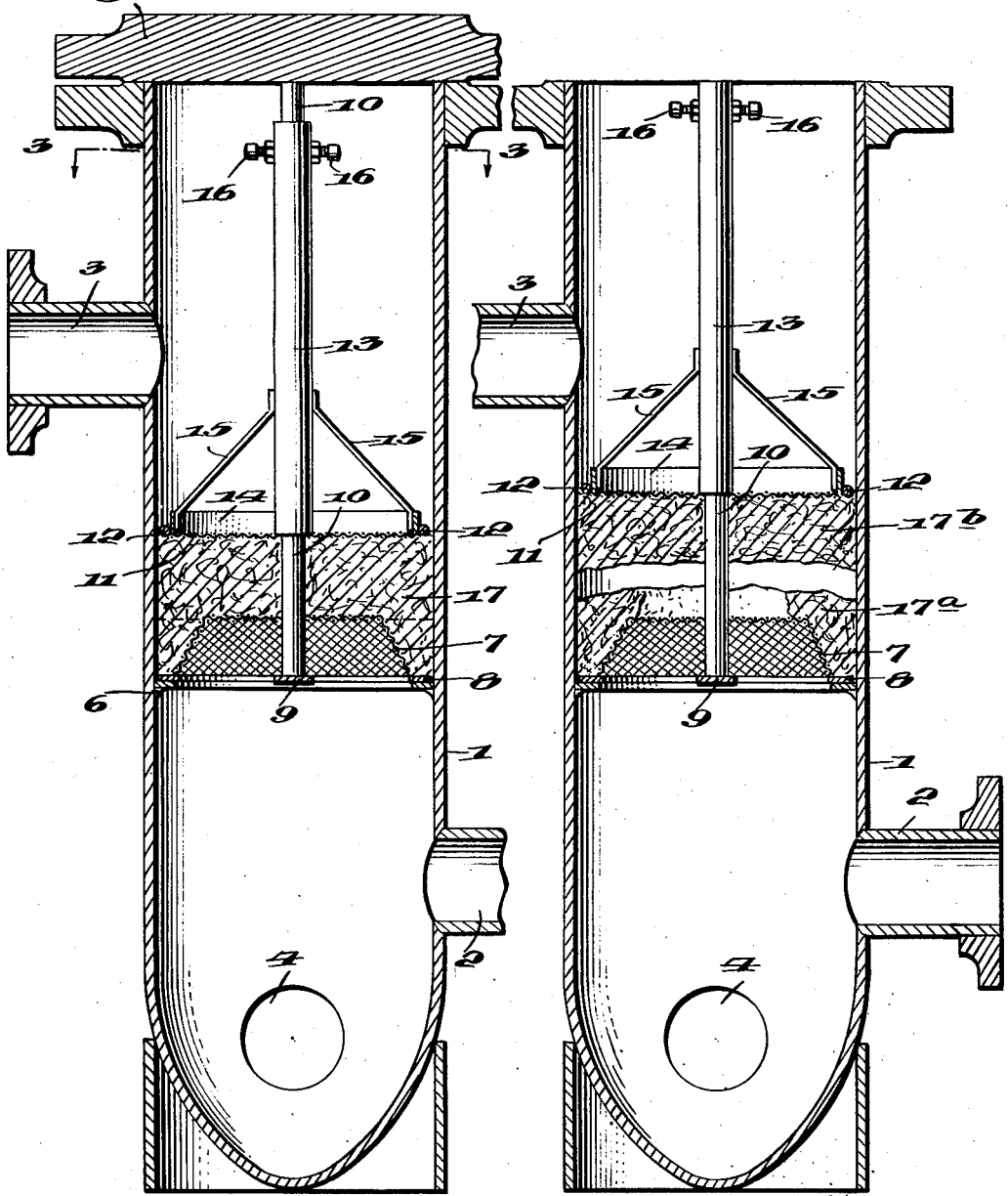
Inventors
ROBERT W. DUCKER,
DON B. BOYDSTON,
EARL J. McCONNELL,
CARL U. DANIELS,
Attorneys

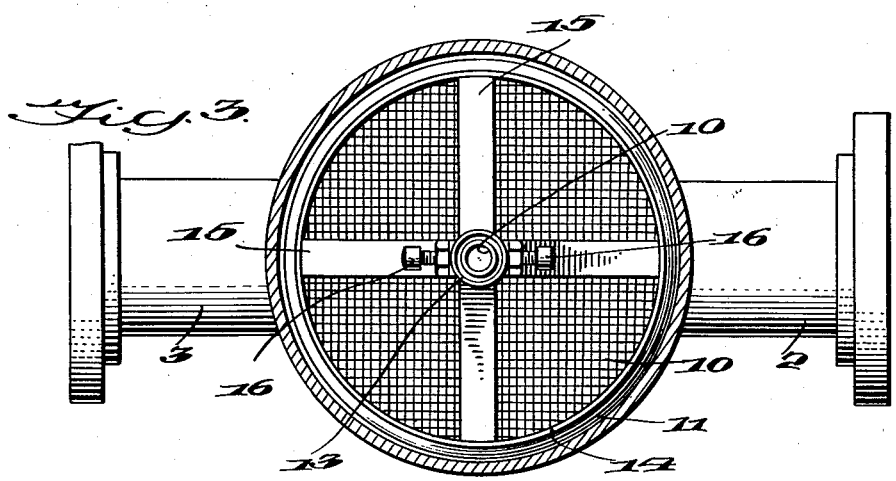
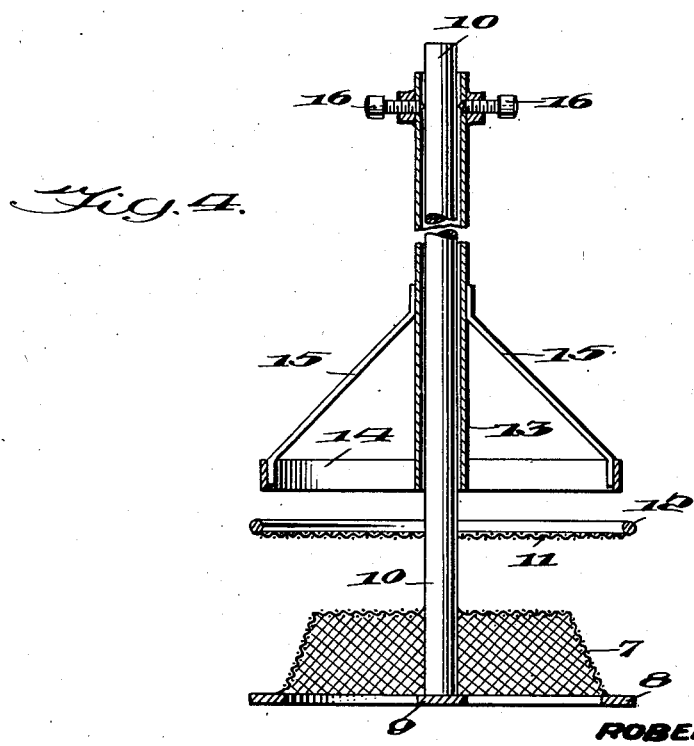

Patented July 9, 1940

2,207,660

UNITED STATES PATENT OFFICE 2,207,660

GAS FILTER

Robert W. Ducker, Don B. Boydston, Earl J. McConnell, and Carl U. Daniels, Tulsa, Okla., assignors to Oklahoma Natural Gas Company, Tulsa, Okla.

Application June 16, 1939, Serial No. 279,574

6 Claims. (Cl. 183—47)

Our invention consists in new and useful improvements in gas filters and relates more particularly to the removal of microscopic dust particles transported by natural gas flowing in high pressure transmission mains.

It is the primary object of the invention to provide a simple, economical and efficient device which may be installed in a gas pipe line or the like for removing dust, rust and other foreign substances which are entrained in the gas.

Heretofore, various efforts have been made to remove pipe line dust consisting principally of iron oxide of extremely fine texture, such for example as passing the gas through oil bath cleaners or scrubbers, and although this type of filter is quite generally used throughout the industry, it has been found that the high cost of the equipment per unit of capacity and the high operation and maintenance costs render such method objectionable from an economic standpoint.

In order to overcome this objection, certain attempts have been made to employ compressible filters for removing dust particles and the like from gas but these have been structurally deficient by reason of the tendency of the gases to channel the edges of the filter and by-pass the filtering material, thus failing to effectively filter out all of the entrained foreign matter.

The present invention is the result of considerable experimentation and is directed to the compressible type of filter having for its main object to overcome the disadvantages above noted. To this end, we have provided an adjustable unit which is so constructed as to insure a proper sealing of the edges of the filtering material against the inner walls of the casing, thus preventing the by-passing of the gas around the edges of the filter, while at the same time so controlling the compression that the center portion of the filter element will not be unduly compressed, thereby avoiding the disadvantage of compacting the entire element.

A further object of the invention is to provide in a filtering unit, a filter element preferably composed of spun glass wool or the like made up of two sections so shaped as to cooperate with the compressing members to more effectively accomplish the sealing of the edges of the filter against the walls of the casing.

A still further object of our invention resides in the simplicity of construction and the ease with which the device may be assembled, disassembled and adjusted.

With the above and other objects in view which will appear as the description proceeds, our invention resides in the novel features hereinafter set forth, illustrated in the accompanying drawings and more particularly pointed out in the appended claims.

Referring to the drawings in which numerals of like character designate similar parts throughout the several views.

Fig. 1 is a vertical sectional view showing our improved filter unit assembled with the filtering element compressed.

Fig. 2 is a similar view showing the unit before the filtering element is compressed.

Fig. 3 is an enlarged horizontal section taken on line 3—3 of Fig. 1, and

Fig. 4 is an enlarged detail of the members forming the filter holder.

In the drawings, 1 represents a cylindrical casing of any suitable diameter, having an inlet conduit 2 towards its lower end and an outlet conduit 3 towards its upper end, a conventional cleanout opening 4 being provided adjacent the bottom of the casing. The upper end of the casing 1 is closed by a removable cover or head 5 of any convenient form.

At a substantially central point on the inner wall of the casing 1, an annular flange 6 is welded or otherwise secured to form a supporting shoulder for the filter element holder. As will best be seen from Fig. 4, the lower member of the holder consists of a truncated cone 7 of suitable wire mesh having a flat outer ring 8 adapted to rest upon the flange 6 when installed in the casing. A cross bar 9 extends across the central portion of the ring 8 and supports a vertical rod 10 which extends through the truncated cone 7 and terminates adjacent the upper end of the casing 1, said rod 10 being welded or otherwise fixed to the cross bar 9 and top portion of the truncated cone member 7.

A disc or wire mesh 11 stretched across a strengthening ring 12 is free to slide on the rod 10 above the truncated cone 7 and, as will later appear, serves as the upper compression member of the holder.

A tube 13 is slidably arranged on the rod 10 above the disc 11, said tube carrying at its lower end a ring 14 supported by straps 15 for contacting the upper surface of the disc 11. This tube is adjustable on the rod 10 and may be locked in adjusted position by suitable set screws 16, or other convenient means.

The filter element is interposed between the truncated cone 7 and the disc 11 and is preferably composed of two sections of spun glass wool 17a and 17b. As will be seen from Fig. 2, these sections are of oversize diameter with respect to the casing. The lower section 17a is in the form of an annular ring which fits between the sides of the wire mesh truncated cone 7 and the walls of the casing and before being compressed extends substantially above the top of the cone 7. The upper section 17b is in the form of a disc which surrounds the rod 10 and rests on top of the lower section.

In installing and assembling this unit, the truncated cone member 7 is inserted through the top of the casing 1 until the ring 8 rests upon the flange 6 in the casing. We then insert the filter element sections 17a and 17b. The wire mesh disc 11 is then placed on the rod 10 on top of the two filter sections, after which the tube 13 is slipped on the rod 10 and lowered until the ring 14 rests upon the top of the disc 11.

The tube 13 and ring 14 are then forced downwardly until the bottom of the upper filter section 17b rests upon the top of the truncated cone 7. Thus, as the tube 13 and ring 14 are moved downwardly as just described, lower element 17a and the outer edges of the upper element 17b are compressed, and by virtue of the sloping sides of the cone 7, the edges of the filtering medium are compressed outwardly against the inner wall of the casing 1, leaving the central portion of the disc 17b substantially uncompressed. The set screws 16 are then screwed into engagement with the rod 10 to lock the compressed filter element at the proper compression.

It will thus be seen that due to the shape of the truncated cone which serves as the inlet holder, differential pressure across the filter ring normal to the wall of the filter body assists materially in effecting the seal, it being understood that at no point is the filter material tightly compressed. In other words, it is our purpose to lightly compress the edges only of the filter element for the definite purpose of preventing flow around the edges and to retain a substantial portion of the sectional area of the filter relatively uncompressed, and we have found that this is facilitated by the shape of the truncated cone 7 and the use of the above described oversize filter sections.

It will be understood that this assembly is installed in a gas pipe line by connecting the inlet and outlet conduits 2 and 3, respectively into the line at a suitable point.

While we have referred particularly to spun glass wool as the filter medium used in connection with our invention, it will be understood that other suitable media may be employed if desired. Furthermore, while we have described the filter element as preferably composed of two sections, we do not intend to limit ourselves in this respect as the filter element may be constructed in one section if properly shaped.

From the foregoing it is believed that the construction and advantages of our improved filter may be readily understood by those skilled in the art without further description, it being borne in mind that numerous changes may be made in the details disclosed without departing from the spirit of our invention as set out in the following claims.

What we claim and desire to secure by Letters Patent is:

1. In a gas filter including a casing having inlet and outlet openings, a filter element interposed between said openings comprising a perforate base member substantially in the form of a truncated cone, a perforate disc member coaxial with said base member, a normally oversize mass of compressible filter medium interposed between said members and surrounding said base member, and means for moving one of said members toward the other to compress the outer edges of said filter medium against the inner wall of said casing.

2. In a gas filter including a casing having inlet and outlet openings, a filter element interposed between said openings comprising a perforate base member substantially in the form of a truncated cone, a perforate disc member coaxial with said base member, a pair of normally oversize sections of compressible filter medium interposed between said members, one of said sections consisting of an annular ring adapted to encircle said base member, and the other section consisting of a disc adapted to rest on top of said first named section, and means for moving one of said members toward the other to compress the outer edges of said ring section around said base member and against the inner wall of said casing, whereby said sections are integrated.

3. In a gas filter including a casing having inlet and outlet openings, a filter element interposed between said openings comprising a truncated cone member of wire mesh, a wire mesh disc member coaxial with said first named member, one of said members being movable with respect to the other, a pair of normally oversize sections of compressible filter medium interposed between said members, one of said sections consisting of an annular ring adapted to encircle said truncated cone, and the other section consisting of a disc adapted to rest on top of said first named section, said movable member adapted to compress the outer edges of said oversize sections around said cone member and against the inner wall of said casing to integrate said sections.

4. In a gas filter including a casing having inlet and outlet openings, a filter element interposed between said openings comprising a truncated cone of wire mesh, means for supporting said cone in said casing, a wire mesh disc arranged coaxial with and movable with respect to said cone, a pair of normally oversize sections of compressible filter medium interposed between said disc and cone, one of said sections consisting of an annular ring adapted to encircle said cone, and the other section consisting of a disc adapted to rest on top of said first named section, and means cooperating with said wire mesh disc for moving the latter axially toward said cone to compress the outer edges of said oversized sections around said cone and against the inner wall of said casing.

5. In a gas filter including a casing having inlet and outlet openings, a filter element interposed between said openings comprising a truncated cone of wire mesh, means for supporting said cone on the inner wall of said casing, an axial guide rod carried by said cone, a wire mesh disc slidable on said guide rod and movable with respect to said cone, a pair of normally oversize sections of compressible filter medium interposed between said cone and said disc, one of said sections consisting of an annular ring adapted to encircle said truncated cone, and the other of said sections consisting of a disc adapted to rest on top of said first named section, a sleeve slidable on said guide rod, a yoke carried by said sleeve in abutting relation to the outer face of said disc, whereby axial movement of said sleeve in one direction will cause compression of the edges of said sections of filter medium around said truncated cone and against the inner wall of said casing, and means for locking said sleeve in compressing position.

6. In a gas filter including a casing having inlet and outlet openings, a filter element interposed between said openings comprising a perforate base member substantially in the form of a truncated cone, a perforate disc member coaxial with said base member, a normally oversize mass of compressible filter medium interposed between said members and having an annular portion surrounding said base member, and means for moving one of said members toward the other to wedge said annular portion between said base member and the inner wall of said casing, whereby the escape of gas past the outer edges of said filter medium is prevented.

ROBERT W. DUCKER.
DON B. BOYDSTON.
EARL J. McCONNELL.
CARL U. DANIELS.